United States Patent
Korczak et al.

(10) Patent No.: US 7,171,753 B2
(45) Date of Patent: Feb. 6, 2007

(54) MULTI-CABLE JACKET REMOVAL TOOL

(75) Inventors: Richard Korczak, Channahon, IL (US); Timothy Crawford, Country Club Hills, IL (US); Al Cox, Orland Park, IL (US); David Low, New Lenox, IL (US)

(73) Assignee: Andrew Corporation, Westchester, IL (US)

( * ) Notice: Subject to any disclaimer, the term of this patent is extended or adjusted under 35 U.S.C. 154(b) by 378 days.

(21) Appl. No.: 10/710,049

(22) Filed: Jun. 15, 2004

(65) Prior Publication Data

US 2005/0274022 A1    Dec. 15, 2005

(51) Int. Cl.
*B26B 27/00* (2006.01)
*B21F 21/00* (2006.01)

(52) U.S. Cl. ......................... 30/90.1; 30/91.2
(58) Field of Classification Search ............... 30/90.1, 30/91.2, 90.7, 90.6; 81/9.4–9.44; 29/242
See application file for complete search history.

(56) References Cited

U.S. PATENT DOCUMENTS

| | | | |
|---|---|---|---|
| 2,836,837 A * | 6/1958 | Belek | 7/107 |
| 2,968,096 A * | 1/1961 | Bonito et al. | 30/90.6 |
| 3,107,424 A * | 10/1963 | Stackawicz | 30/90.3 |
| 3,283,404 A * | 11/1966 | Hickman | 30/91.2 |
| 3,820,420 A | 6/1974 | Matthews | |
| 4,449,298 A | 5/1984 | Putz | |
| 4,945,788 A | 8/1990 | Matthews | |
| 4,979,299 A * | 12/1990 | Bieganski | 30/90.1 |
| 5,050,302 A | 9/1991 | Mills | |
| 5,673,486 A * | 10/1997 | Brown | 30/90.1 |
| 5,822,863 A | 10/1998 | Ott | |
| 6,018,873 A * | 2/2000 | McClellan | 30/90.4 |
| 6,467,171 B2 | 10/2002 | Tarpill | |
| 6,615,493 B2 * | 9/2003 | Shevela | 30/90.1 |
| 2004/0040158 A1 * | 3/2004 | Stalder | 30/90.1 |

* cited by examiner

*Primary Examiner*—Kenneth E. Peterson
*Assistant Examiner*—Sean Michalski
(74) *Attorney, Agent, or Firm*—Babcock IP, PLLC

(57) ABSTRACT

A tool for mid-span cable stripping having a wheel enclosure surrounding an inner wheel with at least one cable saddle formed in an outer circumference, the cable saddle(s) adapted to rotatably cradle a cable of a desired outer diameter. The wheel enclosure having an access cut-away with an over hanging portion that exposes the cable saddle for insertion of the cable. The cable saddle moveable, via rotation of the inner wheel, under the overhanging portion whereby the cable in the cable saddle is retained and a blade coupled to the wheel enclosure with a cutting edge projecting inward engages the cable. Rotation of the tool about the cable strips an outer sheath of the cable. Where multiple cable saddles of different sizes are formed about the circumference of the inner wheel, the tool may be used with a range of different diameter cables.

12 Claims, 3 Drawing Sheets

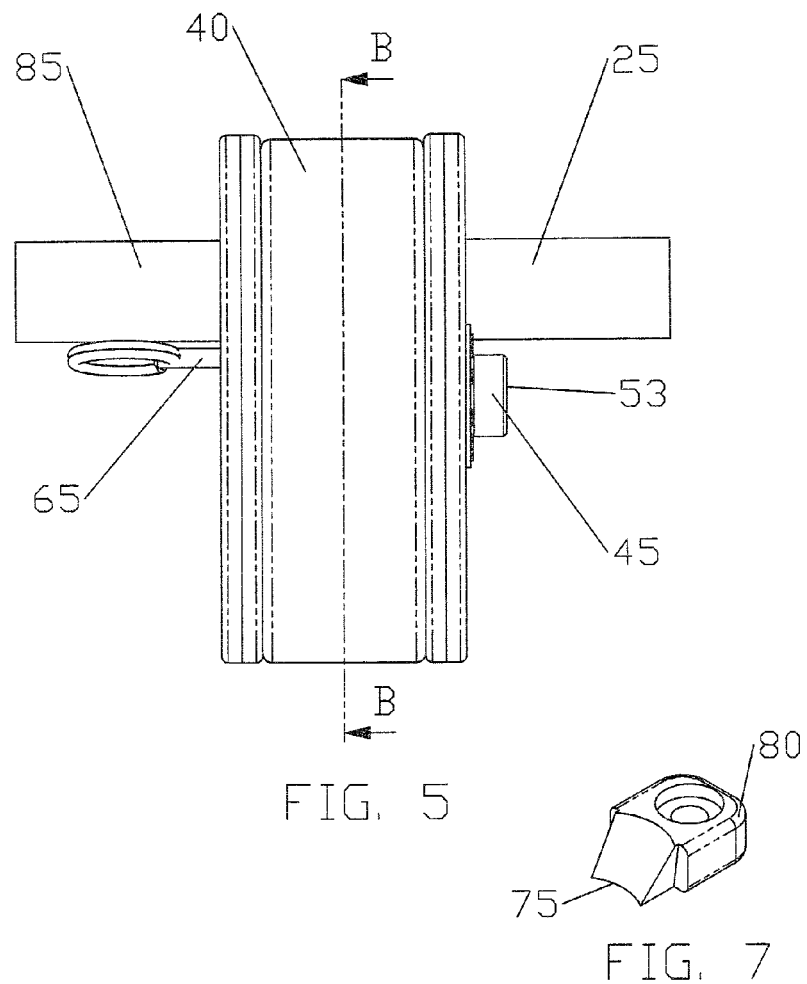
FIG. 5
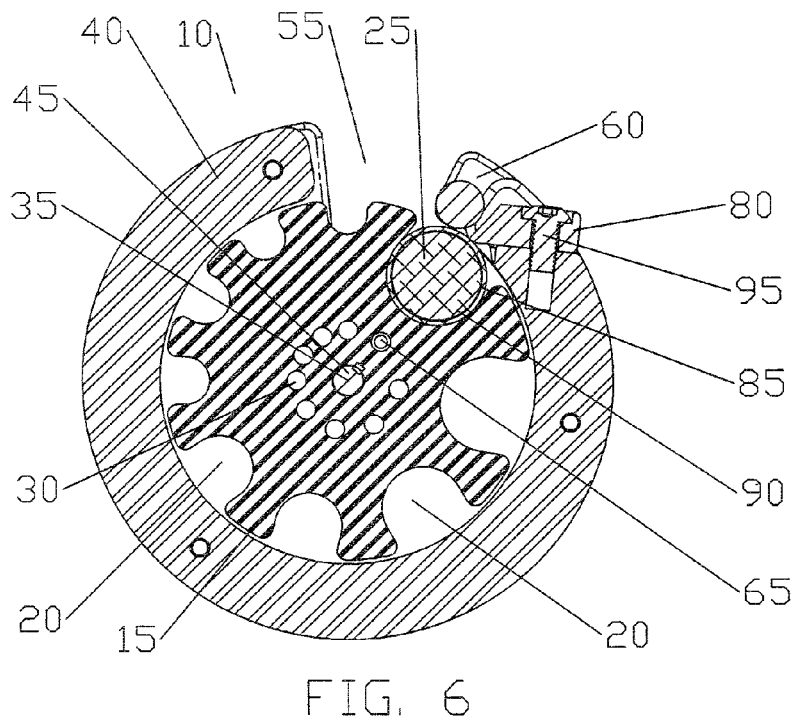
FIG. 7
FIG. 6

US 7,171,753 B2

MULTI-CABLE JACKET REMOVAL TOOL

BACKGROUND OF INVENTION

1. Field of the Invention

This invention relates to tooling for the removal of the outer sheathing of cables and or waveguides. More particularly, the invention is concerned with a multiple cable diameter capable tool for the removal of the outer sheathing from a desired section along the length of the cable.

2. Description of Related Art

Electrical cables and or waveguides may include a plastic outer sheath that electrically insulates and protects the outer metallic conductor or sidewall from environmental degradation such as corrosion and or oxidation. For safety purposes and to minimize electrical interference, long runs of the cables are grounded at regular intervals by mid-span installation of grounding lugs in electrical contact with the metallic outer conductor/sidewall. To enable the installation of each grounding lug, a stripping tool is used to cut off and or peel the desired mid-span area of the plastic outer sheath.

A commonly used stripping tool is a razor utility knife. However, a utility knife may be difficult to quickly apply with precision, resulting in exposure of more than the desired outer conductor/sidewall area and or an increased chance of scoring or tearing damage to the outer conductor. Especially susceptible to damage are cables with outer conductors formed from a plurality of woven and or braided thin individual wire strands. Also, because use of the utility knife depends on the individual training, skill and motivation of the user, training and overall installation labor costs may be increased.

Dedicated cable stripping tools have typically been usable only upon a single diameter cable specific to each tool. Further, these dedicated tools typically include additional features related to preparing the cable end for mounting a connector that increases the overall tool cost. An installer working with a range of different cables may be required to purchase, carry and maintain several of these different stripping tools in order to handle the variety of different cables they may encounter, even if they are only involved with the stringing and grounding of the cables—and not their interconnection or termination.

Competition within the cable and waveguide industry has focused attention on equipment and personnel costs, as well as time requirements for installation and maintenance of cable and or waveguide systems.

Therefore, it is an object of the invention to provide an apparatus that overcomes deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 5 is a schematic end view of the tool and cable of FIG. 1.

FIG. 6 is a schematic cross-sectional view along line B—B of FIG. 5.

FIG. 7 is a perspective view of the blade of FIG. 1.

DETAILED DESCRIPTION

Figure 1:
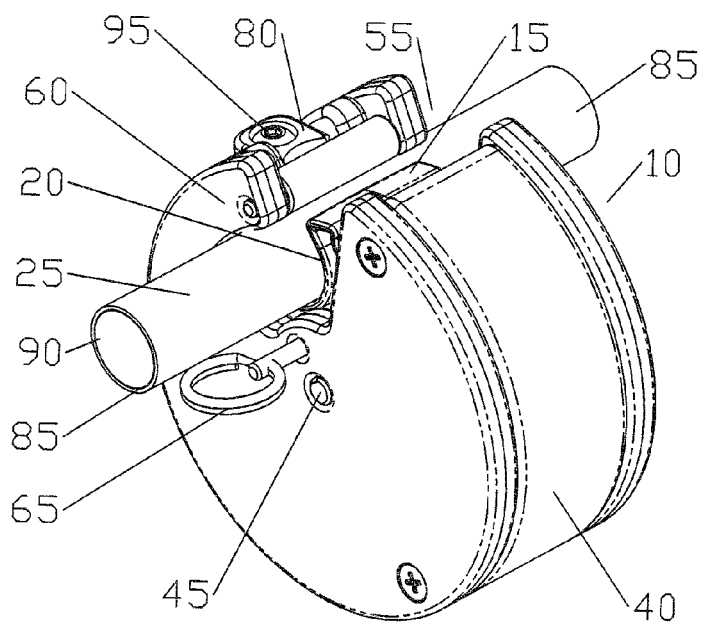
FIG. 1 is a perspective view showing an exemplary embodiment of a tool according to the invention mounted in operating position upon a cable.
Figure 2:
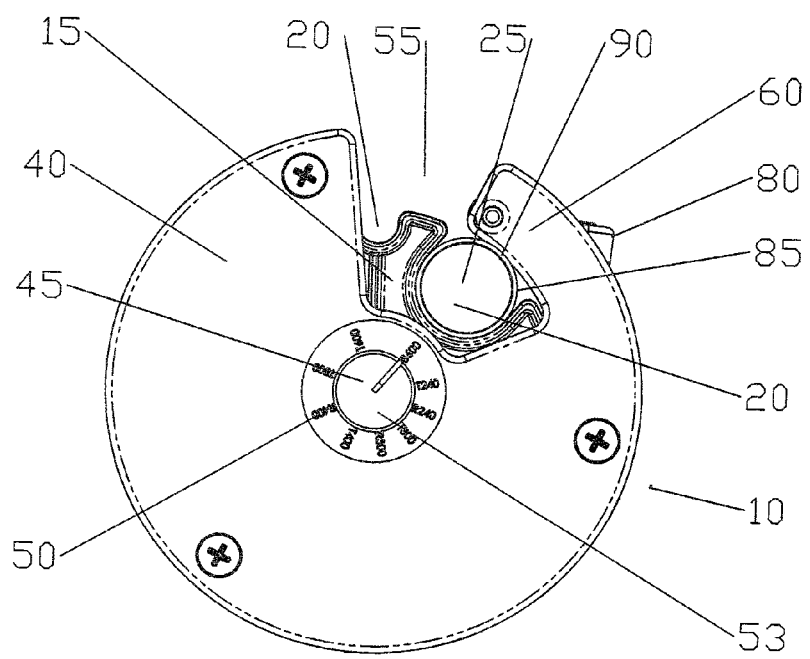
FIG. 2 is a schematic front side view of the tool and cable of FIG. 1.
Figure 3:
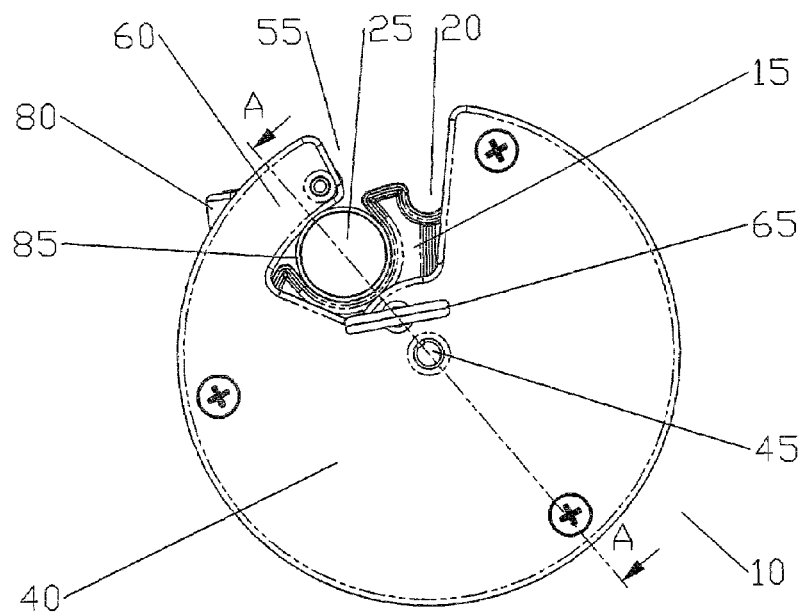
FIG. 3 is a schematic back side view of the tool and cable of FIG. 1.
Figure 4:
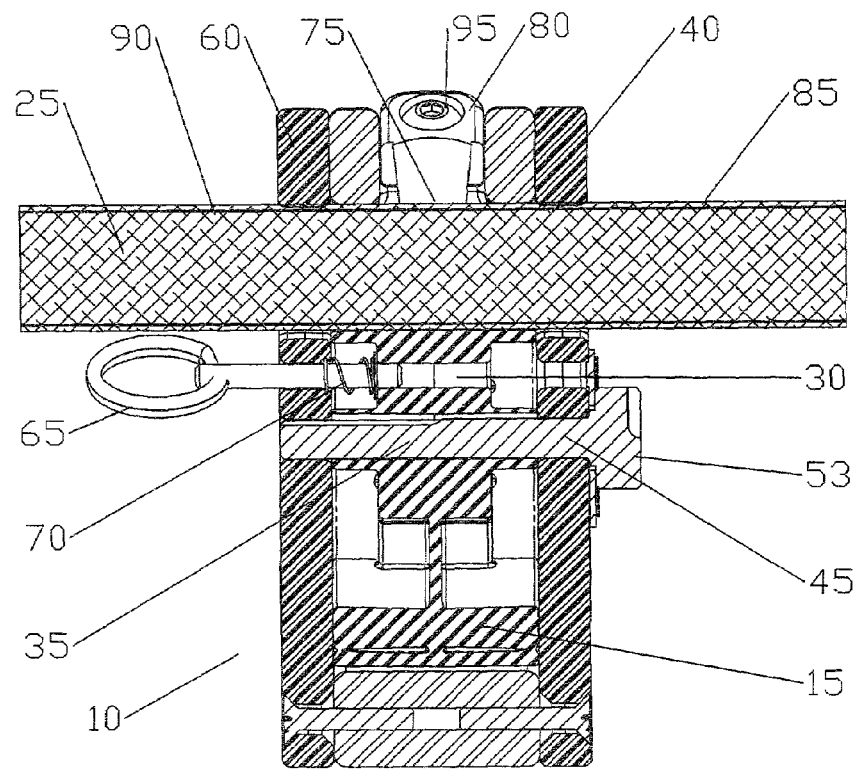
FIG. 4 is a schematic cross-sectional view along line A—A of FIG. 3.

An exemplary embodiment of a tool 10 according to the invention is shown in FIGS. 1–7. An inner wheel 15 is formed with a plurality of cable saddle(s) 20 formed around the outer circumference. Each of the cable saddle(s) 20 is adapted to rotatably cradle a desired cable 25 of a known outer diameter. Locking hole(s) 30 at a common radial distance from a center bore 35 are formed in the inner wheel 15 proximate each cable saddle 20.

The inner wheel 15 is rotatably mounted within a wheel enclosure 40 by an indicator pin 45 passing through and keyed to the center bore 35. Indicia 50, as shown for example in FIG. 2, may be applied to the wheel enclosure 40 and indicator end 53 of the indicator pin 45 to provide additional user feedback that associates a specific cable 25 designation with the selected cable saddle currently in the retained position as described herein below.

The wheel enclosure 40 has an inner wheel access cut-away 55. A cable 25 placed into a desired cable saddle 20 may be moved into a retained position by seating the cable 25 into a selected cable saddle 20 exposed by the access cut-away 55 and rotating the inner wheel 15 and seated cable 25 relative the wheel enclosure 40 so that the cable 25 moves under and is retained by an overhanging portion 60 of the wheel enclosure 40. As the selected cable 25 seated in the matching cable saddle 20 is rotated into a retained position under the overhanging portion 60, a retaining pin 65 mounted to one end of the wheel enclosure 40 biased, for example, by a spring 70 is manually held in an open position by the user. When the retained position is reached, the retaining pin 65 is released, seating the retaining pin 65 in the locking hole 30 associated with the selected cable saddle 20, locking the inner wheel 15 rotationally with respect to the wheel enclosure 40 and thereby the cable 25 and cable saddle 20 in the retained position.

In the retained position, the cable 25 abuts a cutting edge 75 of a blade 80, for example as shown in FIG. 7, mounted to the wheel enclosure 40 that is positioned to strip the outer sheath 85 of the cable 25 as the tool 10 and thereby the cutting edge 75 is rotated about the cable 25. Each cable saddle 20 is adapted to position an outer edge of a matching seated cable 25 at the same radial distance from the center of the tool 10, therefore the blade 80 position need not be changed as different cable(s) 25 and their associated cable saddle(s) 20 are selected for stripping. The cutting edge 75 is positioned to cut into the selected cable 25 only to a predetermined depth that is the expected thickness of the outer sheath 85. In practice, the preferred use of the tool 10 is with a family of cable(s) 25 wherein the outer sheath of each cable 25 has the same thickness independent of the cable(s) 25 overall diameter. When properly configured for the cable 25 to be stripped, the tool 10 will cut strip only the outer sheath 85 of the cable 25 without damaging the outer conductor 90 below. Preferably, the blade 80 is positioned at an angle that presents the cutting edge 75 at an angle that promotes a stripping rather than scraping effect as the tool 10 is rotated about the cable. For example, as shown in FIG. 6, the blade may have an angle of approximately 45 degrees with respect to a tangent line at the point of contact with the cable 25. The blade 80 is attached by a blade screw 95 that removably fixes the blade into the desired position. Alternatively, the tool 10 may be provided with a means for adjusting the blade 80 cutting depth, for example via a set screw movable in a slot or alternative blade mounting screw holes. The blade 80 as shown has a curved cutting edge 75. Alternatively, the cutting edge 75 may be a straight edge. For higher economy, the blade 80 may also be a flat razor.

As best shown in FIG. 6, the exemplary embodiment has a plurality of cable saddles usable with a range of cables having different outer diameters. On skilled in the art will recognize that the number and size of possible cable saddles is a function of the outer diameter of the desired cables and the desired overall diameter of the resulting tool. Further, a tool according to the invention may be formed with fewer than the maximum allowable number of cable saddles or, for example, only a single cable saddle. Where a single cable saddle is used, the inner wheel 15 may be formed with reduced overall size, for example, as a circular section such as a wedge pivotable between the openly accessible area of the access cut-away and the retained position under the overhanging portion 60.

From the foregoing, it will be apparent that the present invention brings to the art a new and improved tool useful of precision mid-span cable stripping. A single tool according to the invention may be used with a range of different cable diameters with minimal tool re-configuration. Further, the tool is compact, durable and cost efficient to manufacture.

| Table of Parts | |
|---|---|
| 10 | tool |
| 15 | inner wheel |
| 20 | cable saddle |
| 25 | cable |
| 30 | locking hole |
| 35 | center bore |
| 40 | wheel enclosure |
| 45 | indicator pin |
| 50 | indicia |
| 53 | indicator end |
| 55 | access cut-away |
| 60 | overhanging portion |
| 65 | retaining pin |
| 70 | spring |
| 75 | cutting edge |
| 80 | blade |
| 85 | outer sheath |
| 90 | outer conductor |
| 95 | blade screw |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A cable stripping tool, comprising:
   a wheel enclosure surrounding
   an inner wheel with at least one cable saddle formed in an outer circumference, the cable saddle(s) having a longitudinal axis substantially parallel to a rotation axis of the inner wheel adapted to rotatably cradle a cable of a desired outer diameter; and
   a blade coupled to the wheel enclosure with a cutting edge projecting inward;
   the wheel enclosure having an access cut-away with an over hanging portion, the access cut away exposing the cable saddle for insertion of the cable;
   the cable saddle moveable, via rotation of the inner wheel relative to the wheel enclosure to a position, under the overhanging portion whereby the cable in the cable saddle is retained and the blade engages the cable.

2. The tool of claim 1, wherein the at least one cable saddle is a plurality of cable saddles formed spaced around the outer circumference of the inner wheel;
   each of the cable saddles dimensioned whereby the cable which mates with each respective cable saddle has an outer edge at a substantially equivalent radial distance from a center bore of the inner wheel when mounted in the cable saddle.

3. The tool of claim 1, further including a locking hole proximate each of the at least one cable saddle(s); and a retaining pin configured to engage the locking hole when the cable in the cable saddle is retained under the overhanging portion, locking the inner wheel with respect to the wheel enclosure.

4. The tool of claim 3, wherein retaining pin is biased towards the locking hole by a spring.

5. The tool of claim 1, wherein the inner wheel is rotatably coupled to the wheel enclosure by an indicator pin.

6. The tool of claim 5, wherein the indicator pin is keyed to the inner wheel and an indicator end of the indicator pin cooperates with indicia on the wheel enclosure to provide feedback of which cable saddle is retained.

7. The tool of claim 1, wherein the cutting edge has a curved surface.

8. The tool of claim 1, wherein the blade is positioned with respect to the cable whereby when the blade engages the cable, the cutting edge penetrates an outer sheath of the cable but not an outer conductor of the cable.

9. The tool of claim 1, wherein the blade is positioned with respect to the cable whereby when the blade engages the cable and the tool is rotated about the cable a section of an outer sheath of the cable is stripped from the cable.

10. The apparatus of claim 1, wherein the blade is removably coupled to the wheel enclosure.

11. The apparatus of claim 1, wherein the blade has an angle of approximately 45 degrees with respect to a tangent line of the cable at a point on an outer surface of the cable where the blade engages the cable.

12. A mid-span cable stripping tool, comprising:
    a wheel enclosure surrounding
    an inner wheel with at least one cable saddle formed in an outer circumference, the cable saddle(s) adapted to rotatably cradle a cable of a desired outer diameter;
    a blade coupled to the wheel enclosure with a cutting edge projecting inward;
    an access cut-away of the wheel enclosure with an over hanging portion that exposes the cable saddle for insertion of the cable;

the cable saddle moveable, via rotation of the inner wheel, under the overhanging portion whereby the cable in the cable saddle is retained and the blade engages the cable; and a locking hole proximate each of the at least one cable saddle(s);

a retaining pin configured to engage the locking hole when the cable in the cable saddle is retained under the overhanging portion, locking the inner wheel with respect to the wheel enclosure.

* * * * *